United States Patent [19]
Janssen et al.

[11] Patent Number: 6,129,115
[45] Date of Patent: Oct. 10, 2000

[54] SELF-LATCHING SOLENOID VALVE ASSEMBLY

[75] Inventors: Eric P. Janssen, Howell; Thomas R. Jones, Walled Lake, both of Mich.

[73] Assignee: MAC Valves, Inc., Wixom, Mich.

[21] Appl. No.: 09/347,043

[22] Filed: Jul. 2, 1999

[51] Int. Cl.[7] ............................ F15B 13/044; F16K 31/08
[52] U.S. Cl. ................ 137/625.65; 251/65; 251/129.15; 335/234
[58] Field of Search .......................... 137/625.65; 251/65, 251/129.15; 335/234

[56] References Cited

U.S. PATENT DOCUMENTS

| | | | |
|---|---|---|---|
| 3,368,788 | 2/1968 | Padula | 251/65 |
| 3,379,214 | 4/1968 | Weinberg | 137/625.5 |
| 3,458,769 | 7/1969 | Stampfli | 317/123 |
| 3,683,239 | 8/1972 | Sturman | 317/150 |
| 3,821,967 | 7/1974 | Sturman | 137/624.15 |
| 4,056,255 | 11/1977 | Lace . | |
| 4,403,765 | 9/1983 | Fisher | 251/65 |
| 4,720,078 | 1/1988 | Nakamura et al. | 251/129.15 |
| 4,758,811 | 7/1988 | Slavin et al. | 335/234 |
| 5,127,625 | 7/1992 | Kleinhappl | 251/129.17 |
| 5,259,416 | 11/1993 | Kunz et al. | 137/883 |
| 5,365,210 | 11/1994 | Hines | 335/238 |
| 5,584,465 | 12/1996 | Ochsenreiter | 251/65 |
| 5,584,466 | 12/1996 | Fukano et al. | 251/65 |

FOREIGN PATENT DOCUMENTS 1-234672  9/1989  Japan .

Primary Examiner—Gerald A. Michalsky
Attorney, Agent, or Firm—Bliss McGlynn, P.C.

[57] ABSTRACT

A self-latching solenoid valve assembly including a valve body having a pressurized air supply inlet port for communicating with a source of pressurized air and at least one cylinder port. A valve member is supported in the valve body so as to be movable between predetermined positions to selectively direct pressurized air from the inlet port to at least one cylinder port. A biasing member is employed to move the valve member in one direction and a solenoid assembly is used to move the valve member in an opposite direction. The solenoid assembly includes a housing with a solenoid coil supported therein and a fixed ferromagnetic pole piece having a passage extending therethrough with a pushpin movably supported in the passage. A ferromagnetic latch is also supported by the housing and spaced from the pole piece. A permanent magnet is disposed between the latch and the pole piece. The magnet is movable toward the pole piece under the influence of an electromagnetic flux generated by a pulse of current generated through the coil in one direction thereby driving the permanent magnet against the pushpin to move the valve member to one predetermined position. In addition, the permanent magnet is also movable away from the pole piece and toward the latch under the influence of an electromagnetic flux generated by a pulse of current flowing through the coil in an opposite direction. When this occurs, the biasing member moves the valve member to another predetermined position. A control circuit for changing the direction of the current through the coil is also disclosed.

16 Claims, 3 Drawing Sheets

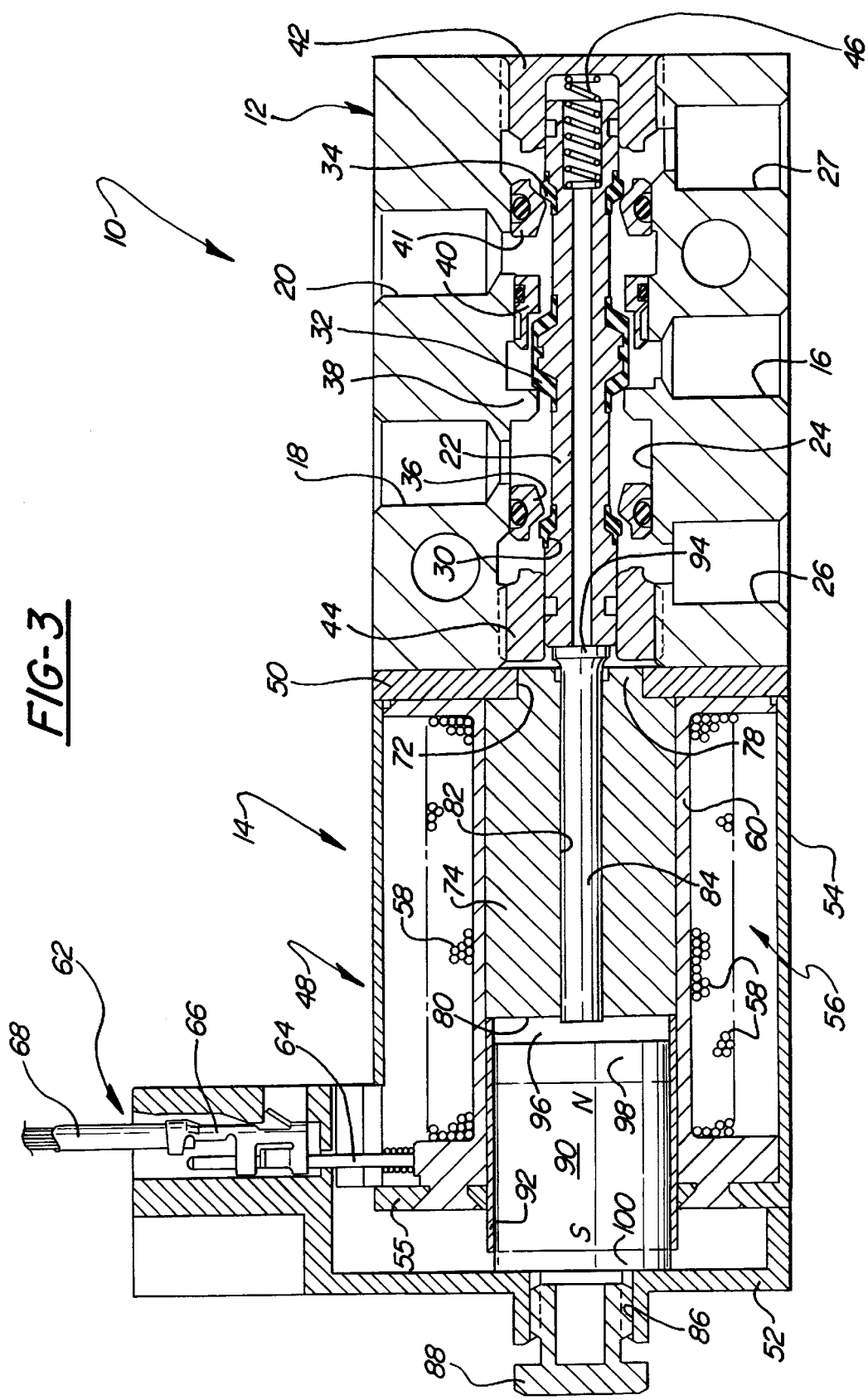

SELF-LATCHING SOLENOID VALVE ASSEMBLY

BACKGROUND OF THE INVENTION

1. Field of the Invention

The present invention relates, generally, to solenoid actuated valves and, more specifically, to self-latching solenoid actuated valves and control circuits for operating same.

2. Description of the Related Art

Solenoids are well known electromechanical devices used to convert electrical energy into mechanical energy and particularly into short stroke mechanical motion. As such, solenoids have long been employed to actuate valves in response to an electrical signal. For example, it is known in the related art to employ a solenoid to bias a valve member in one direction against the biasing force of a return spring. When power to the solenoid is interrupted, the return spring biases the valve member back to its first position.

In certain applications, valve members must be positively maintained in different predetermined positions to control the flow of fluids, such as air, through the valve. One embodiment employed in the related art to achieve this results eliminates the return spring employed to bias the valve member to a specific location and replaces it with a second solenoid. The second solenoid is powered to positively move the valve member to a predetermined position and maintain it there until the second solenoid is de-energized and the first solenoid is energized to move the valve member back to the other position. However, this approach suffers from the disadvantage that double solenoid operated valves increase the size, weight, cost and complexity of the valve. Further, in the case of poppet-type valves, at least one coil must be powered at all times to ensure that the valve member is properly seated in the predetermined position. An unexpected, inadvertent or even planned shut down of power to the solenoid results in a loss of control of the valve. Additionally, in applications where the efficiency of the solenoid is of concern, such as where there is a limited source of electrical power, solenoids which must be continually powered to hold a valve member in a specific position or double solenoid actuated valves are generally unacceptable.

To decrease the power dissipated by the solenoid, and particularly in applications where the solenoid is to be retained in the actuated position for significant time periods, latching mechanisms are employed in the related art to hold the mechanical output of the solenoid in one position or the other without continuous power required to the solenoid. To this end, conventional self-latching solenoids known in the related art typically employ a movable pole piece and a fixed permanent magnet which are subject to an electromagnetic flux to bias a valve member. Usually, current flowing through the coil in one direction causes the pole piece to move away from the permanent magnet and to be attracted to another stationary element in the solenoid thereby actuating the valve member. Power to the coil is then interrupted but the latent magnetic force acting on the movable pole piece causes it to remain magnetically attracted to the stationary portion of the solenoid or "latched" in its last position.

Control circuits are used to reverse the direction of current through the solenoid coil thereby reversing the direction of electromagnetic flux. Reversing the direction of current through the coil reverses the "polarity" of the movable pole piece, driving it in the opposite direction toward the permanent magnet where it again becomes "latched" after the power to the solenoid has been interrupted. The return spring is then typically free to bias the valve member in the opposite direction. In this way, the valve member may be moved to, and maintained in, any predetermined position by actuation of the solenoid after a relatively short pulse of electrical current through the solenoid coil.

While the self-latching solenoid actuated valves known in the related art have generally worked well for their intended purposes, there continues to be a need for smaller, faster acting self-latching solenoid actuated valves having low power consumption. This is especially true for small pneumatic valves used, for example, to control small air cylinders. In addition, there continues to be a need for control circuits which result in lower power consumption than those circuits known in the related art.

SUMMARY OF THE INVENTION

The present invention overcomes these deficiencies in the related art in a self-latching solenoid valve assembly including a valve body having a pressurized air supply inlet port for communicating with a source of pressurized air and at least one cylinder port. A valve member is supported in the valve body so as to be movable between predetermined positions to selectively direct pressurized air from the inlet port to at least one cylinder port. A biasing member is employed for moving the valve member in one direction and a solenoid assembly is used to move the valve member in the opposite direction. The solenoid assembly includes a housing with a solenoid coil supported therein and a fixed, ferromagnetic pole piece having a passage extending therethrough with a pushpin movably supported in the passage. In addition, a ferromagnetic latch is supported by the housing and spaced from the pole piece. A permanent magnet is disposed between the latch and the pole piece. The permanent magnet is movable toward the pole piece under the influence of an electromagnetic flux generated by a pulse of current flowing through the coil in one direction thereby driving the permanent magnet against the pushpin to move the valve member to one predetermined position. Additionally, the permanent magnet is movable away from the pole piece and toward the latch under the influence of an electromagnetic flux generated by a pulse of current flowing through the coil in an opposite direction. When this occurs, the biasing member moves the valve member to the other predetermined position.

A circuit for controlling the valve assembly is also disclosed. This circuit is necessary in applications where electrical isolation of the two control signal supply lines is required to prevent damage of control circuits caused by a reverse polarity feedback signal or other transient signal. The circuit includes a solenoid having a coil. The coil has a first end and a second end. The circuit also includes a first switching circuit electrically connected to the first and second ends of the coil to allow current to pass therethrough in a first direction to move the permanent magnet against the pushpin in a first axial direction. The circuit further includes a second switching circuit electrically connected to the first and second ends of the coil to allow a current to pass therethrough in a second direction to move the permanent magnet away from the pushpin in a second axial direction. Further, when either switching circuit is allowing current to flow through the coil, it electrically isolates one negative control source from the other.

In addition, the use of a pair of switching circuits electrically connected to the coil results in a relatively low voltage drop across the circuit when compared with conventional circuits known in the related art.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is a cross-sectional side view of a self-latching solenoid valve assembly of the present invention showing the permanent magnet adjacent to the latch.

DETAILED DESCRIPTION OF THE PREFERRED EMBODIMENT(S)

Figure 1:
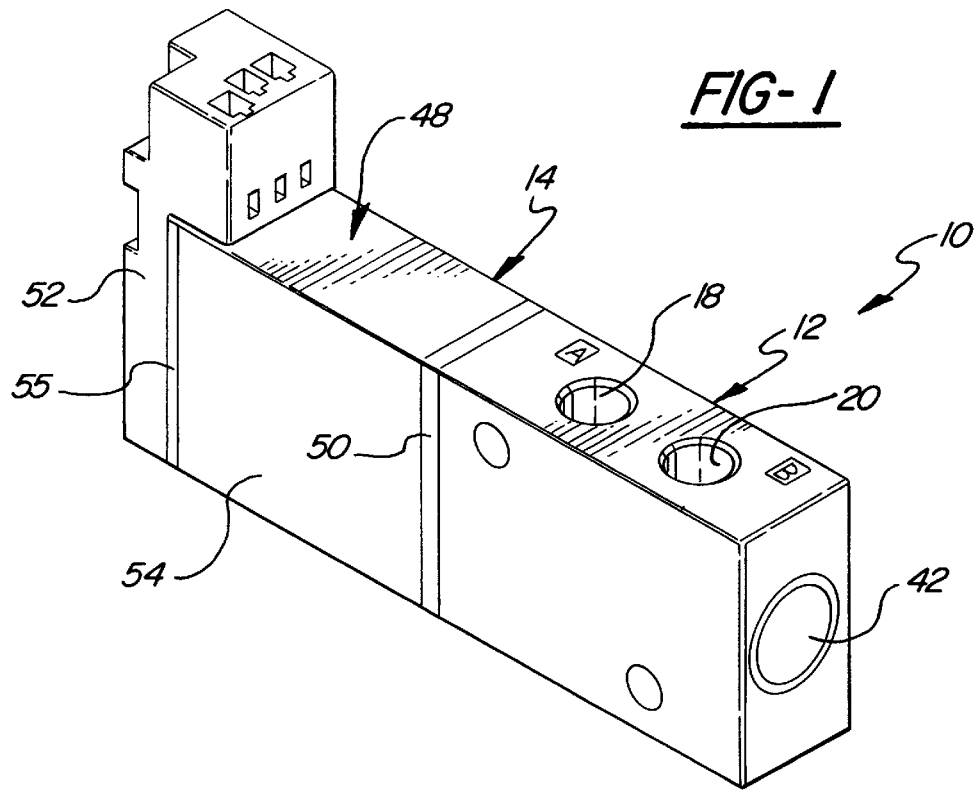
FIG. 1 is a perspective view of the self-latching solenoid valve assembly of the present invention.
Figure 2:
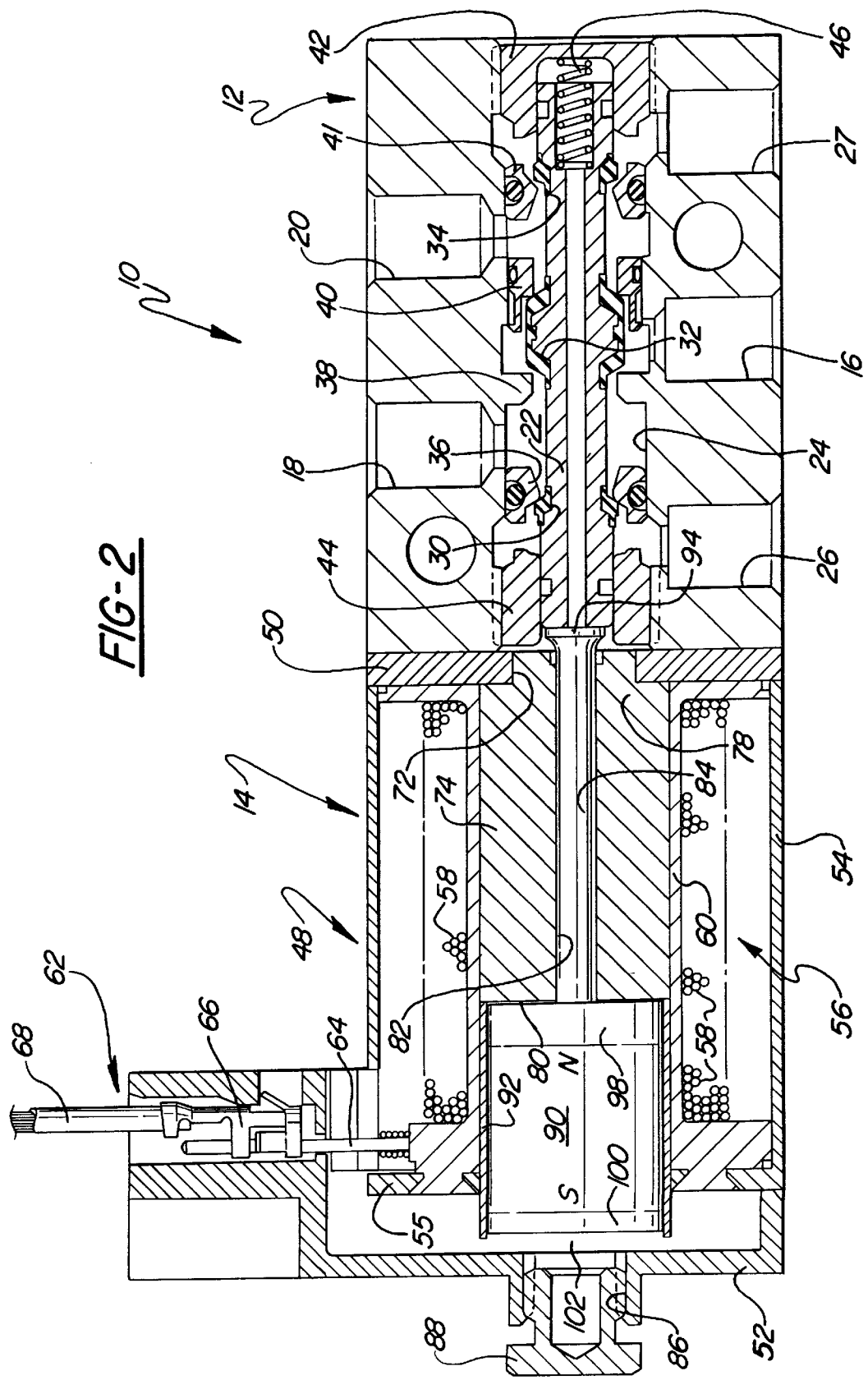
FIG. 2 is a cross-sectional side view of the self-latching solenoid valve assembly showing the permanent magnet latched to the pole piece.

A self-latching solenoid valve assembly of the present invention is generally indicated at 10 in FIGS. 1 through 3 where like numerals are used to describe like structure. The solenoid valve assembly 10 includes a valve body 12 and a solenoid assembly 14 mounted to the valve body 12. The valve body 12 includes a pressurized air supply inlet port 16 for communicating with a source of pressurized air and at least one cylinder port 18, 20. A valve member 22 is supported in the valve body 12 so as to be movable between predetermined positions to selectively direct pressurized air from the inlet port 16 to at least one of the cylinder ports 18, 20.

More specifically, the valve body 12 is rectangular in shape and includes a valve bore 24 extending axially through the valve body 12 which provides fluid communication between the air supply inlet passage 16, a pair of cylinder passages 18, 20 and a pair of exhaust ports 26, 27. As shown in the drawings, the valve member is a poppet valve 22 which is supported within the valve bore 24 for reciprocal movement therein to control the flow of fluid through the valve body 12. The poppet valve member 22 is preferably an aluminum insert over molded and bonded with rubber in specific areas of the valve member 22 and ground to specific dimensions to form valve elements 30, 32, 34. The valve elements 30, 32, 34 engage adjacent valve seats 36, 38, 40, 41 presented in the valve bore 24 for sealing various flow passages as the valve member 22 is reciprocated between positions within the valve bore 24.

A cup shaped retainer 42 is threadably disposed at one end of the valve bore 24. A threaded insert 44 is located in the bore 24 opposite the retainer 42. A biasing member 46, such as a coiled return spring, is positioned between the retainer 42 and one end of the poppet valve member 22. The return spring 46 applies a constant biasing force against the poppet valve member 22 and to the left as viewed in FIG. 2. On the other hand, the poppet valve member 22 is actuated in the opposite direction, or to the right as viewed in FIG. 2, under the influence of the solenoid assembly 14 as will be described in greater detail below. As described above and shown in the drawings, the valve assembly employs a four way valve. However, those having ordinary skill in the art will appreciate that the present invention as described and claimed herein may also be employed with two way, three way or any other type of solenoid actuated valve.

The solenoid assembly 14 includes a housing, generally indicated at 48. The housing 48 includes a pole plate 50 abutting the valve body 12, a cap 52 disposed opposite the pole plate 50 and a solenoid can or frame 54 extending therebetween. The frame 54 supports a coil 56 including a conductive wire 58 conventionally wrapped around a bobbin 60. The conductive wire 58 is connected to a source of electrical current through leads, generally indicated at 62. The leads 62 are supported in the cap 52 and include lead pins 64, electrical contacts 66 and lead wires 68. The lead wires 68 are operatively connected to the source of electrical current. The direction of the current through the coil 56 and thus the direction of the electromagnetic force generated thereby is controlled by a control circuit, generally indicated at 70 in FIG. 4 as will be described in greater detail below. A top plate 55 is mounted adjacent to the bobbin 60 and between a portion of the frame 54 and the cap 52.

The pole plate 50 includes an opening 72 extending therethrough. The solenoid assembly 14 further includes a ferromagnetic pole piece 74 having a stepped portion 78 with a smaller cross-sectional area than the rest of the pole piece 74. The stepped portion 78 is received in the opening 72 of the pole plate 50 for mechanically fixing the pole piece 74 to the pole plate 50. A thin piece of non-magnetic stainless steel 80 caps the pole piece 74 opposite the pole plate 50. A centrally located passage 82 extends through the pole piece 74. A pushpin 84 is movably supported in the passage 82.

The cap 52 of the solenoid housing 48 includes a threaded bore 86. A ferromagnetic latch 88 is threadably mounted to the solenoid housing 48 in the bore 86 but spaced from the pole piece 74. The latch 88 is made of iron but may be made of any ferromagnetic material. A permanent magnet 90 is disposed between the latch 88 and the pole piece 74. A bushing 92 guides the magnet 90 within the bobbin 60. The permanent magnet 90 is movable toward the pole piece 74 under the influence of an electromagnetic flux generated by a pulse of current flowing through the coil 56 in one direction. This flux drives the permanent magnet 90 against the pushpin 84 to move the valve member 22 to one predetermined position. Furthermore, the permanent magnet 90 is movable away from the pole piece 74 and toward the latch 88 under the influence of an oppositely directed electromagnetic flux generated by a pulse of current flowing through the coil 56 in the opposite direction. When this occurs, the biasing member 46 moves the valve member 22 to another predetermined position, for example to the left as shown in FIG. 3.

To this end, the pushpin 84 presents an enlarged head 94 which is disposed adjacent one end of the poppet valve member 22 for contacting it when the permanent magnet 90 contacts the pushpin 84. In addition, the enlarged head 94 of the pushpin 84 limits the movement of the pushpin 84 within the passage 82 of the pole piece 74 under the influence of the biasing member 46 through the valve member 22 when the permanent magnet 94 has moved toward the latch 88. The limited movement of the pushpin 84 presents a gap 96 between the permanent magnet 90 and the pole piece 74 as shown in FIG. 3.

As illustrated in FIG. 2, a space 102 is defined between the latch 88 and the permanent magnet 90 when the permanent magnet is moved toward the pole piece 74. Furthermore, the position of the latch 88 toward and away from the permanent magnet 90 may be adjusted by adjusting the position of the threaded latch 88 within the threaded bore 86 in the cap 52. Accordingly, the size of the space 102 between the latch 88 and the permanent magnet 90 when the permanent magnet has moved toward the pole piece 74 may be adjusted. In this way, the attractive force between the latch 88 and the permanent magnet 90 may be modulated.

The permanent magnet 90 may be of any suitable type but preferably is a rare earth neodymium-iron-boron magnet. The permanent magnet 90 defines north and south poles at opposite ends thereof as indicated in the figures. However, it will be appreciated by those having ordinary skill in the art that the poles may be reversed. A protective cap 98 is bonded to the north pole and a protective cap 100 is bonded to the south pole. These caps 98, 100 protect the permanent magnet 90 as it is cycled toward the pole piece 74 and the latch 88.

Figure 4:
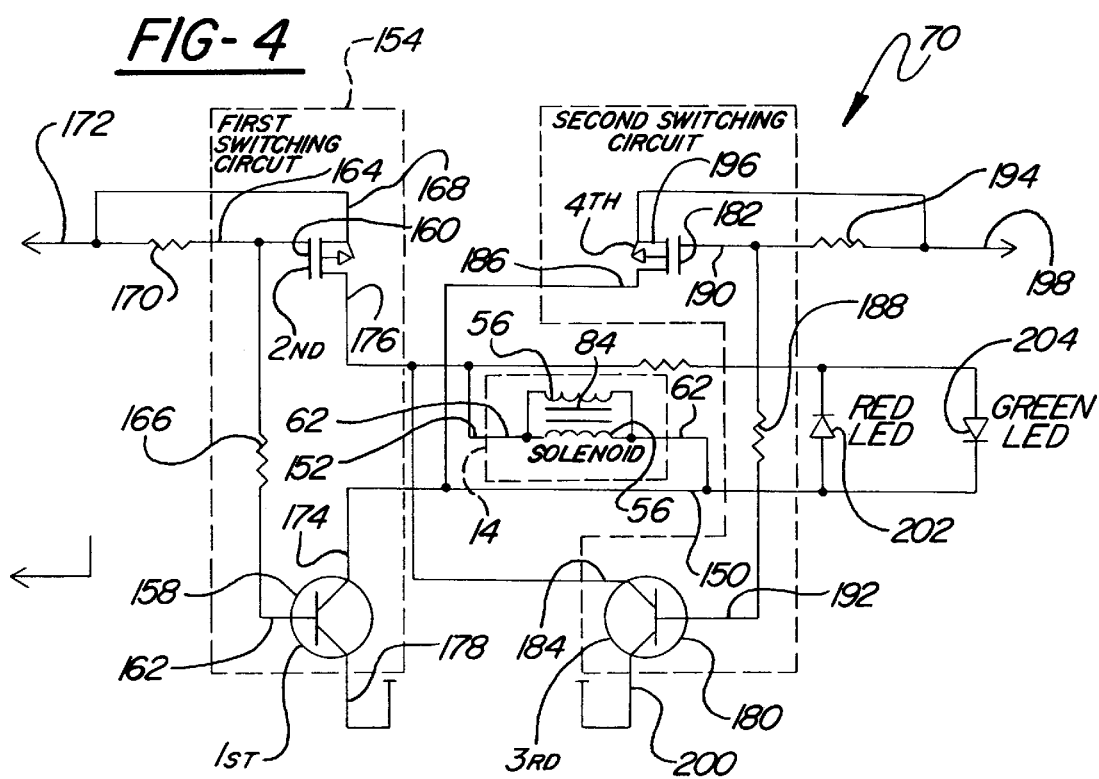
FIG. 4 illustrates the electrical control circuit employed to reverse the direction of the current through the coil.

Referring to FIG. 4, a circuit, generally indicated at 70, is shown for controlling the self-latching solenoid valve assembly 10. The circuit 70 includes a solenoid 14 having a coil 56 and a permanent magnet 90. The electrical leads 62 of the coil 56 extend out of a first end 150 and a second end 152 of the solenoid 14. Current travels through the coil 56 through the lead 62 at either end 150, 152. The direction of the current as it passes through the ends 150, 152 determines whether the permanent magnet 90 will be biased in a first axial direction or a second axial direction opposite that of the first axial direction.

Connected to the first end 150 of the solenoid 14 is a first switching circuit 154 and a second switching circuit 156. The first switching circuit 154 allows current to flow through the solenoid 14 in one direction and the second switching circuit 156 allows current to flow through the solenoid 14 in a second direction opposite in direction to that of the first direction.

The first switching circuit 154 includes a first transistor 158 and a second transistor 160. In the embodiment shown in FIG. 4, the first transistor 158 is a pnp bipolar junction transistor. The second transistor 160 is a MOSFET. The reasons for using two different types of transistors is to reduce the overall voltage drop across the transistors 158, 160 as well as to reduce the bias requirements. A base 162 of the first transistor 160 is connected to a gate 164 of the second transistor 160 through a resistor 166. The gate 164 of the second transistor 160 is also connected to a drain 168 of the second transistor 160 through a resistor 170. The drain 168 and resistor 170 are also connected to a negative input control source 172. The negative input control source 172 provides the input required to determine whether the self-latching valve assembly 10 is to be forced in the direction provided in the first switching circuit 154. A collector 174 of the first transistor 178 is connected to the first end 150 of the solenoid 14 and a source of 176 of the second transistor 160 is connected to the second end 152 of the solenoid 14. An emitter 178 of the first transistor 158 is connected to the power supply, 24 volts in this embodiment.

The second switching circuit 156 mirrors the first switching circuit in that it includes a third transistor 180 and a fourth transistor 182. The differences are that the third transistor 180 is a bipolar junction transistor with its collector 184 electrically connected to the second end 152 of the solenoid 14 and the fourth transistor 182 is a MOSFET with its source 186 electrically connected to the first end 150 of the solenoid 14. A resistor 188 is connected between the gate 190 of the fourth transistor 182 and the base 192 of the third transistor 180. Another resistor 194 is connected between the gate 190, the resistor 188, and the drain 196 of the fourth transistor 182. The resistor 194 and the drain 196 are also connected to a negative input control source 198 providing input to switch the self-latching valve assembly 10 in the opposite direction as that from the negative input 172. Power is received by the solenoid 14 through the emitter 200 of the third transistor 180 which is connected directly to the power supply.

A red LED 202 and a green LED 204 are connected to the first end 150 and the second end 152 of the solenoid 14. These LEDs 202, 204 are connected in opposite directions such that when the solenoid 14 is activated in one direction, the red LED 202 will emit light and when the solenoid 14 is activated in the opposite direction, the green LED 204 will emit light. This allows an operator to view the assembly 10 and know in which mode the self-latching valve assembly 10 should be operating.

Operation

In operation, current is driven through the coil 56 in one direction which generates an electromagnetic flux. The electromagnetic flux polarizes the pole piece 74 attracting the permanent magnet 90. The movable permanent magnet 90 is thus driven toward the pole piece 74 across the gap 96 and engages the pushpin 84, as shown in FIG. 2. This drives the pushpin 84 to the right moving the poppet valve 22 also to the right and against the biasing force of the coil spring 46.

Power to the coil 56 is then interrupted. However, the permanent magnet 90 remains in its position shown at FIG. 2 and "latched" to the pole piece 74 due to the residual attractive forces that remain even in the absence of an electromagnetic flux. In this disposition, valve element 30 cooperatively seals with valve seat 36 and valve element 32 cooperatively seals with valve seat 40. Conversely, the valve element 32 is open with respect to the valve seat 38 and the valve element 34 is open with respect to the valve seat 41.

With the valve member 22 shifted to the right as described above and shown in FIG. 2, pressurized air flowing into the valve body 12 via the inlet port 16 passes the valve element 32 and valve seat 38, flows through the valve bore 24 and out the cylinder passage 18. At the same time, air is exhausted from the cylinder passage 20 past the valve element 34 and valve seat 41 and out the valve body 12 via the exhaust port 27. The exhaust port 26 is sealed by the valve element 30 and the valve seat 36.

The valve member 22 remains in this disposition until current is again driven through the coil 56 in an opposite direction. This produces an electromagnetic flux in a direction opposite to the first flux described above. The oppositely directed magnetic flux changes the polarity of the pole piece 74 which acts to repel the permanent magnet 90. Thus, the permanent magnet 90 moves away from the pole piece 74 and toward the latch 88 thereby closing the space 102 therebetween. The coil spring 46 biases the valve member 22 to the left as shown in FIG. 3. The pushpin 84 is also shifted to the left under the influence of this biasing force acting through the valve member 22. Current to the coil 56 is then interrupted. However, the permanent magnet 90 remains in the position shown in FIG. 3 and is "latched" to the latch 88 due to the residual attractive forces that remain even in the absence of an electromagnetic flux.

In this disposition, the valve element 32 cooperatively seals with the valve seat 38 and valve element 34 cooperatively seals with valve seat 41. Conversely, the valve element 32 is now open with respect to the valve seat 40 and the valve element 30 is open with respect to the valve seat 36.

With the valve member 22 shifted to the left as described above and shown in FIG. 3, pressurized air flowing into the valve body 12 via the inlet port 16 passes the valve element 32 and valve seat 40, flows through the valve bore 24 and then out the cylinder passage 20. At the same time, air is exhausted from the cylinder passage 18, past the valve element 30 and valve seat 36 and then out the valve body 12 via the exhaust port 26. The exhaust port 27 is sealed by the valve element 34 and the valve seat 41. The valve member 22 remains in this disposition until current is again driven through the coil 56 in an opposite direction. The valve member 22 is then shifted back to the right as shown in FIG. 2 and described above.

In addition, a pair of switching circuits is employed to control the direction of current to the coil and to electrically isolate one negative control input source from the other negative control input source. This effectively prevents damage to the control circuits caused by a reverse polarity feedback signal or other transient signal. Switching circuits of the present invention provide a relatively low voltage drop across the circuit when compared with conventional circuits known in the related art. Accordingly, the self-latching solenoid valve assembly of the present invention facilitates reduced cost and size in a fast-acting valve assembly having self-latching capabilities.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A self latching solenoid valve assembly, said assembly comprising:

a valve body having a pressurized air supply inlet port for communicating with a source of pressurized air and at least one cylinder port;

a valve member supported in said valve body so as to be movable between predetermined positions to selectively direct pressurized air from said inlet port to said at least one cylinder port;

a biasing member for moving said valve member in one direction and a solenoid assembly for moving said valve member in an opposite direction;

said solenoid assembly including a housing with a solenoid coil supported therein, a fixed, ferromagnetic pole piece having a passage extending therethrough with a pushpin movably supported in said passage;

a ferromagnetic latch supported by said housing and spaced from said pole piece; and a permanent magnet disposed between said latch and said pole piece, said magnet being movable toward said pole piece under the influence an electromagnetic flux generated by a pulse of current flowing through said coil thereby driving said permanent magnet against said pushpin to move said valve member to one predetermined position and said permanent magnet movable away from said pole piece and toward said latch under the influence of an electromagnetic flux generated by a pulse of current flowing through said coil in an opposite direction wherein said biasing member moves said valve member to another predetermined position.

2. An assembly as set forth in claim 1 wherein said pushpin presents an enlarged head adjacent to said valve member for contacting same when said permanent magnet contacts said pushpin.

3. An assembly as set forth in claim 1 wherein said assembly includes a bobbin, said coil including a conductive wire wrapped around said bobbin, said wire connected to a source of electrical current.

4. An assembly as set forth in claim 1 wherein said permanent magnet defines north and south poles at opposite ends thereof, a protective cap covering said north pole and ends thereof, a protective cap covering said north pole and a protective cap covering said south pole to protect said magnet as it is moved toward said pole piece and said latch.

5. An assembly as set forth in claim 1 wherein a space is defined between said latch and said permanent magnet when said permanent magnet is moved toward said pole piece.

6. An assembly as set forth in claim 5 wherein said solenoid housing includes a threaded bore, said latch being threadably mounted to said housing in said bore such that the position of said latch toward and away from said permanent magnet may be adjusted thereby adjusting the size of said space between said latch and said permanent magnet when said magnet has moved toward said pole piece.

7. An assembly as set forth in claim 1 wherein said solenoid housing includes a pole plate abutting said valve body, a cap disposed opposite said pole plate and a solenoid frame extending therebetween and disposed about said coil.

8. An assembly as set forth in claim 7 wherein said pole plate includes an opening extending therethrough, said pole piece including a body and a stepped portion with a smaller cross-sectional area than said body, said stepped portion received in said opening of said pole plate for mechanically fixing said pole piece to said pole plate.

9. A self latching solenoid valve assembly, said assembly comprising:

a valve body having a pressurized air supply inlet port for communicating with a source of pressurized air and at least one cylinder port;

a valve bore extending axially within said valve body and a poppet valve member movable between predetermined positions within said valve bore to selectively direct pressurized air from said inlet port to said at least one cylinder port;

a retainer disposed at one end of said bore with a return spring positioned between said retainer and one end of said poppet valve member for moving said poppet valve member in one direction;

a solenoid assembly for moving said poppet valve member in an opposite direction;

said solenoid assembly including a housing with a solenoid coil supported therein, a fixed, ferromagnetic pole piece having a passage extending therethrough with a pushpin movably supported in said passage;

a ferromagnetic latch supported by said housing and spaced from said pole piece; and a permanent magnet disposed between said latch and said pole piece, said magnet being movable toward said pole piece under the influence an electromagnetic flux generated by a pulse of current flowing through said coil thereby driving said permanent magnet against said pushpin to move said valve member to one predetermined position and said permanent magnet movable away from said pole piece and toward said latch under the influence of an electromagnetic flux generated by a pulse of current flowing through said coil in an opposite direction wherein said biasing member moves said valve member to another predetermined position.

10. An assembly as set forth in claim 9 wherein said pushpin presents an enlarged head adjacent to said valve member for contacting same when said permanent magnet contacts said pushpin.

11. An assembly as set forth in claim 9 wherein said assembly includes a bobbin, said coil including a conductive wire wrapped around said bobbin, said wire connected to a source of electrical current.

12. An assembly as set forth in claim 9 wherein said permanent magnet defines north and south poles at opposite ends thereof, a protective cap covering said north pole and a protective cap covering said south pole to protect said magnet as it is moved toward said pole piece and said latch.

13. An assembly as set forth in claim 9 wherein a space is defined between said latch and said permanent magnet when said permanent magnet is moved toward said pole piece.

14. An assembly as set forth in claim 13 wherein said solenoid housing includes a threaded bore, said latch being threadably mounted to said housing in said bore such that the position of said latch toward and away from said permanent magnet may be adjusted thereby adjusting the size of said space between said latch and said permanent magnet when said magnet has moved toward said pole piece.

15. An assembly as set forth in claim 9 wherein said solenoid housing includes a pole plate abutting said valve body, a cap disposed opposite said pole plate and a solenoid frame extending therebetween and disposed about said coil.

16. An assembly as set forth in claim 15 wherein said pole plate includes an opening extending therethrough, said pole piece including a body and a stepped portion with a smaller cross-sectional area than said body, said stepped portion received in said opening of said pole plate for mechanically fixing said pole piece to said pole plate.

* * * * *

UNITED STATES PATENT AND TRADEMARK OFFICE
CERTIFICATE OF CORRECTION

PATENT NO. : 6,129,115
DATED : October 10, 2000
INVENTOR(S) : Janssen et al.

It is certified that error appears in the above-identified patent and that said Letters Patent are hereby corrected as shown below:

Column 7, line 15, "ofthe" should read --of the--.
Column 8, lines 1 and 2, delete "a protective cap covering said north pole and ends thereof."

Signed and Sealed this

Eighth Day of May, 2001

Attest:

NICHOLAS P. GODICI

Attesting Officer

Acting Director of the United States Patent and Trademark Office